(12) United States Patent
Ardes

(10) Patent No.: US 12,053,727 B2
(45) Date of Patent: Aug. 6, 2024

(54) OIL FILTER CARTRIDGE

(71) Applicant: Hengst SE, Münster (DE)

(72) Inventor: Wilhelm Ardes, Ascheberg (DE)

(73) Assignee: HENGST SE, Münster (DE)

( * ) Notice: Subject to any disclaimer, the term of this patent is extended or adjusted under 35 U.S.C. 154(b) by 0 days.

(21) Appl. No.: 18/500,365

(22) Filed: Nov. 2, 2023

(65) Prior Publication Data

US 2024/0131459 A1 Apr. 25, 2024

Related U.S. Application Data

(63) Continuation of application No. PCT/EP2022/061845, filed on May 3, 2022.

(30) Foreign Application Priority Data

May 7, 2021 (EP) .................................. 21172792

(51) Int. Cl.
*B01D 35/30* (2006.01)
*B01D 29/15* (2006.01)
*B01D 35/00* (2006.01)

(52) U.S. Cl.
CPC ............. *B01D 35/30* (2013.01); *B01D 29/15* (2013.01); *B01D 35/005* (2013.01); *B01D 2201/295* (2013.01); *B01D 2201/304* (2013.01); *B01D 2201/4053* (2013.01); *B01D 2201/4092* (2013.01)

(58) Field of Classification Search
CPC ...... B01D 35/30; B01D 29/15; B01D 35/005; B01D 2201/295; B01D 2201/304; B01D 2201/4053; B01D 2201/4092; B01D 35/306; B01D 29/21; B01D 2201/291; B01D 2201/342; B01D 35/147; B01D 35/16; B01D 35/153; B01D 2201/347
USPC ..... 210/232, 450, 493.2, 440–444, 435, 451
See application file for complete search history.

(56) References Cited

U.S. PATENT DOCUMENTS 5,702,602 A 12/1997 Brown et al.
8,333,818 B2 * 12/2012 Foerster ............. B01D 46/0039
210/450

FOREIGN PATENT DOCUMENTS

| CN | 2846840 Y | 12/2006 |
| CN | 109475797 A | 3/2019 |
| CN | 208660566 U | 3/2019 |
| DE | 10309428 A1 | 9/2004 |
| EP | 1870152 A1 | 12/2007 |
| EP | 2373398 A1 | 10/2011 |
| GB | 2158364 A | 11/1985 |
| WO | 2020201480 A1 | 10/2020 |

OTHER PUBLICATIONS

European Patent Office, Extended Search Report, Application No. 21172792.0, Oct. 5, 2021, 6 pages.
PCT International Search Report and Written Opinion, PCT/EP2022/061845, Jul. 28, 2022, 14 pages.

* cited by examiner

*Primary Examiner* — Madeline Gonzalez
(74) *Attorney, Agent, or Firm* — Quarles & Brady, LLP; Yakov S. Sidorin

(57) ABSTRACT

A filter cartridge can prevent a filter housing cover from becoming unintentionally loose, if the filter cartridge includes a wedge element configured to be forced by the fluid pressure into a gap between the filter cartridge and the housing cover.

19 Claims, 13 Drawing Sheets

OIL FILTER CARTRIDGE

CROSS-REFERENCE TO RELATED APPLICATIONS

This application is a continuation of the pending International Application No. PCT/EP2022/061845 filed on May 3, 2022 and now published as WO 2022/233867, which designates the United States and claims priority from European Application No. 21172792.0 filed on May 7, 2021. The disclosure of each of the above-identified patent documents is incorporated herein by reference.

BACKGROUND

1. Field of the Invention

The invention relates to a fluid filter cartridge for being removably inserted into a fluid filter housing with a housing socket and a housing cover. The filter cartridge has a filter element forming a fluid channel, a front end and a rear end. A connector element may be attached to the front end, wherein the connector element has at least a forward-facing side facing away from the front end into a forward direction and a peripheral surface. The peripheral surface has at least one radially protruding segment. A first fluid port in the forward-facing side may be fluid communication with a first fluid opening in the radially outward facing surface of the filter cartridge. A second fluid port may be in fluid communication with the fluid channel. A gasket may be supported on a first and/or second ring surface of the peripheral surface.

2. Description of Related Art

Filter cartridges are presently used in numerous applications to filter fluids being used in any kind of machinery, typical examples of these fluids are air, oil and water. If a filter is clogged or reaches a service interval the filter housing can be opened, typically by removing the housing cover from the housing socket. Next, the filter cartridge can be removed and a new filter cartridge can be inserted prior to closing the housing again. Often, the housing cover is threaded to the housing socket, which requires mostly less space and is easier to handle than some sort of elastic caging pushing the housing cover to the socket. In many applications, however, the filter housing is subjected to vibrations and at the same time pressure fluctuations of the fluid to be filtered. This combination may lead to the situation that the housing cover unintendedly unthreads, which may lead to catastrophic engine failures. For example, consider a sudden oil pressure of a combustion engine under full load being the consequence of an unintendedly opening the combustion engine's oil filter housing during.

EP 1 870 152 A relates to a flow optimized filter for pressurized gas having in inlet channel and an outlet channel which contain an upper filter part, and a hollow cylindrical filter element having lower filter part. The upper filter part has housing and an insert, in which the course of the inlet and outlet channels is optimized. The insert is rotatably supported and exchangeable within the housing.

DE 10 309 428 A1 suggests a gas filter with a housing top and a housing bottom. In between of these is a rotatable connecting flange. A rotation of the flange allows to convert the filter from a coalescence filter for removing condensate into a dust filter and vice versa.

GB 2,158,364A addresses the problem of providing a large diameter pipeline strainer that combines the advantages of increased filter area, easy cleaning, and low pressure drop as known for basket type strainers with the advantages of Y-type strainers being smaller in size and less expensive. The suggested pipeline strainer comprised a body having a chamber, an inlet to said chamber and an outlet from said chamber. The inlet and the outlet are coaxial and define a longitudinal axis. The body has a lateral opening at said chamber, a removable cover for sealing said lateral opening, and a strainer member mounted in said chamber and being removable through said lateral opening.

WO 2020/201480 A1 relates to a to a filter with a filter housing having two filter housing parts. A filter insert is replaceably arranged in the second filter housing part. The filter insert has a filter material body and two end panels. An annular seal support supports a seal that is movably guided on the filter insert in an axially limited manner relative to the end panel. The seal support simultaneously forms or has the valve element of a valve. The end panel faces the joint between the filter housing parts forms the valve seat and a medium passage is selectively released or blocked by means of the valve.

EP 2 373 398 A1 relates to an air filter with a housing comprising a socket and a cover enclosing a volume in which a replaceable filter cartridge is positioned. The filter cartridge comprises an essentially cylindrical filter element with a fluid channel. On top of the filter element is a connector for connecting the filter element with the socket. The connector has a first port being in fluid communication with an air outlet of the socket. The air enters the filter cartridge via a first port and passes through a conduit of the connector to a slot in the peripheral surface of the filter cartridge. Subsequently, the air passes the filter element, enters the fluid channel and from there flows via a second conduit of the connector to an air inlet of the socket. The connector and the upper end of the housing cover jointly engage into a recess of the socket, wherein a collar of the connector is located in between of the socket facing surface of the tubular housing cover and the bottom of the complementary recess. The housing cover facing surface of the collar is inclined and supports a gasket. When closing the cover by threading the housing cover onto the housing socket, the gasket is compressed in a corner being delimited by the inclined surface of the collar, the radially inward facing surface of the socket's recess the socket facing end of the housing cover.

SUMMARY OF THE INVENTION

The problem to be solved by the invention is to ensure that the filter housing cover of a fluid filter system remains fully closed during operation of the filter system.

In an embodiment the solution is provided by a filter cartridge. The filter cartridge may be configured to be removably inserted into a filter housing with a housing socket and a housing cover. In most applications the housing cover and the socket have complementary screw threads allowing to screw the housing cover to the socket. As initially explained, the housing cover may be threaded onto the housing socket when installing the filter cartridge. The filter cartridge can even be retrofitted into a huge number of existing filter housings.

The filter cartridge has a filter element with a fluid channel. As usual the fluid channel defines a longitudinal axis, which in most applications coincides with the filter axis. Further, the filter element has a front end and a rear end. The filter element can be made of plied filter paper, cloth, filter foam or the like.

A connector element, as well briefly referred to as "connector", may be attached to the front end. For example, the front end of the filter element may have a front end cap to which the connector may be attached. Of course, the filter element may as well include a rear end cap at its rear end. The front-end cap and the connector may as well be unitary, i.e. be a single part. The connector has a forward-facing side facing away from the front end of the filter element into a forward direction. This forward direction is typically but not necessarily parallel to the longitudinal axis. Deviations from perfect parallelism can be accepted, be they intended or unintended. Only for conceptual simplicity, we assume that the forward direction is parallel within an angle $\alpha_l$ to the longitudinal axis, wherein $\alpha_l$ is an error margin and may be, e.g., one of 30°, 20°, 15°, 10°, 5°, 1.5°, 1°, 0.5' or 0°. Thus at least essentially parallel means parallel $\pm\alpha_l$ (within $\alpha_l$), wherein $\alpha_l \in A=\{30°, 20°, 15°, 10°, 5°, 1.5°, 1°, 0.5°, 0°\}$ and an angle $\alpha$ is considered to be within "$\pm\alpha_l$" if—$\alpha_l \leq \alpha \leq \alpha_l$. Further, the connector has rearward-facing side. The rearward side faces in the opposite direction compared to the forward-facing side and hence towards the filter element's front end. Thus, the rearward direction is opposed to the forward direction. Again, deviations within $\pm\alpha_l$ can be accepted.

Further, the connector has a peripheral surface. The peripheral surface typically (but not necessarily) connects the forward-facing side and the rearward facing side, thus it may span from a forward edge to a rearward edge being formed by the peripheral surface and the forward-facing side or the rearward facing side, respectively. In practice these forward edge as well as the rearward edge may be rounded or other forms of a smooth transition may be realized. Preferably, the peripheral surface may be a ring surface, particularly preferred it may be a rotationally invariant ring surface being rotationally invariant under a rotation around the longitudinal axis. The rotational symmetry may as well be broken, e.g. because only discrete rotations (e.g. by rotations by $2\pi/n$, $n \in \{2, 3, 4, 5, \ldots, N\}$ and N being an integer, e.g. 1000) project the peripheral surface onto itself. In another example, the peripheral surface may not be rotationally invariant but mirror symmetric, e.g. relative to the longitudinal axis (mirror axis) and or/or at least one mirror plane including the longitudinal axis.

The peripheral surface may preferably include at least one protruding segment. The protruding segment may be gasket and/or a wedge element facing surface delimiting a face of a protrusion of the connector, which protrusion extends (e.g., radially) outwards. The protruding segment may be a (preferably inclined) surface facing towards the wedge element. Thus, the protruding segment may as well form a step as will be explained with reference to the Figures. Radially outwards means in this example that radius of the peripheral surface in the area of the protruding segment may be larger than the radius of the first and/or second ring surfaces.

The filter cartridge may further include a first fluid port in the forward-facing side. This first fluid port may be in fluid communication with a first fluid opening in the radially outward facing surface of the filter cartridge. The radially outward facing surface of the filter cartridge may be essentially the peripheral surface of the filter cartridge. Only to avoid ambiguities, i.e. to verbally distinguish the peripheral surface of the connector from the peripheral surface of the filter cartridge, the peripheral surface of the filter cartridge is referenced to as radially outward facing surface of the filter cartridge.

For example, an optional first conduit may fluidly connect the first fluid port and the first fluid opening thereby setting them in fluid communication. The optional first conduit may be provided by the connector.

Preferably, a second fluid port of the filter cartridge may be in fluid communication with the fluid channel. The fluid communication may as well be established via an optional second conduit connecting the second port and a second fluid opening. Again, the optional second conduit may be provided by the connector, but as will explained below and with reference to the Figures the optional second conduit can be omitted, if the socket is adapted to connect directly to the fluid channel, e.g. via a through hole in a front-end cap.

A gasket may be movably supported on a first and/or second ring surface of the peripheral surface of the connector. Accordingly, the gasket may be configured to be shifted parallel to the axial direction, thereby sliding over the first and/or second ring surface.

The gasket may be configured to seal a gap between a filter housing surrounding the first and/or second ring surface of the peripheral surface of the connector and the filter cartridge. For example, the gasket may be configured to seal a gap between a filter housing surrounding the first and/or second ring surface of the peripheral surface of the connector and the first and/or second ring surface of the peripheral surface of the connector. Thus, in operation, the gasket may seal a gap between the housing and the filter cartridge, to thereby prevent the filter from spilling.

In a preferred example, the position of the gasket on the first and/or second ring surface of the peripheral surface of the connector may be between the rear end facing boundary of the first fluid opening and the front end of the filter cartridge. In other words the first and/or second ring surface of the peripheral surface of the connector element is preferably between the first fluid opening and the front end of the filter cartridge. It is noted that a portion of the gasket may even extend over or into the first fluid opening as will be apparent from the figures. Thus, in operation, the pressure of the fluid being filtered may push the gasket axially towards the front end. In other words, the pressure drop between the forward facing side and the rearward facing side of the gasket results in a force in the forward direction, i.e. towards the forward end of the filter cartridge.

Thus, a fluid to be filtered may flow from the first fluid port, which may be located in the forward-facing side of the connector, through a first conduit to the first fluid opening in the radially outward facing surface of the filter cartridge and hence from there to the peripheral surface of the filter element. The fluid may then pass the filter element, e.g., radially inwards, enter the fluid channel and may be removed via the second fluid port from the fluid channel. The second fluid port may be provided by an end cap of the filter element or as well by the connector. The second fluid port may thus be fluidly connected via a second conduit with the fluid channel. The flow direction of the fluid can of course be reversed, but the described flow direction from the first port via the first conduit to and via the filter element into the fluid channel and from there to the first port is preferred.

In a preferred example, the filter cartridge further includes at least one optional wedge element being movably supported on the peripheral surface in between of the gasket and the protruding segment. The wedge element may have a first wedge surface and a second wedge surface. The first wedge surface may face towards the protruding segment and/or the second wedge surface may face away from the peripheral surface. The wedge element may further include a back side connecting the first wedge surface and the second wedge surface. The back side of the wedge element may thus face away from the protruding segment.

The at least one wedge element may be movably supported to be moved in a first direction from a first position into a second position by exerting a force parallel to the longitudinal axis to the back side. For example, the first direction may be a superposition of the forward direction and the radial direction. In another example, the first direction may be a superposition of the rearward direction and the radial direction. In any case, the first wedge surface may be (preferably directly) adjacent to the protruding segment, but other means may be located in between. Relevant is only that the protruding segment provides an at least indirect abutment on which the first wedge element slides in the first direction.

The at least one wedge element, at least if in its first position, may be positioned in between of the gasket and the protruding segment. This sequence is herein referred to asl "alternative I". In a second example, the gasket and the wedge element are located at opposite sides of the protruding segment, i.e. the protrusion may as well be in between of the gasket and the wedge element. This second example is herein referred to as "alternative II".

The protruding segment may have a plain bearing surface on which the wedge element may be movably supported to slide on its first wedge surface in the first direction if a force with an axial component facing toward the protruding segment is exerted to the back side of the wedge element. In the example of alternative I this force may be directed in the forward direction and in the example of alternative II the force may point in the rearward direction.

As apparent from the above the wedge element may be forced in the first direction thereby being radially supported by the protruding segment. If mounted, in the filter housing the second wedge surface abuts the inner surface of the housing cover (if it has been forced accordingly) and thereby establishes a force fit between the filter cartridge and the housing cover. Thus, almost any housing cover can be prevented from accidentally opening during operation by retrofitting the filter cartridge. In operation, i.e. once a fluid pressure is provided, in alternative I the pressure drop between the rear and the forward side of the gasket 80 provides a force that pushes the gasket against the back side of the wedge element and thereby provides a force shifting the wedge in the first (i.e. forward) direction. In alternative II, the pressure drop provides a force that pushes the gasket against the protrusion and hence shifts the protruding segment against the wedge element, leading to the same result. In both alternatives, the wedge element moves relative to the filter cartridge in the first direction and establishes the force fit which prevents the housing cover form inadvertently rotating.

Preferably, if in the first position, the wedge element does not radially protrude over the protruding segment, whereas if in the second position, the wedge element preferably radially protrudes over the protruding segment in the radial direction. This eases a simple installation of the filter cartridge in the filter housing.

In a preferred example, the at least one wedge element may be a ring segment. The at least one wedge element may as well include or be attached to a ring segment.

Preferably the ring segment at least partially encircles the peripheral surface. This measure increased reliability of the force fit and further enables to distribute the force evenly around the peripheral surface.

For example, the ring segment may be an initially closed ring a with weak link being configured to break if the wedge element is moved from the first position in the first direction towards the second position, thereby allowing the ring segment to increase its radius while being shifted. At the same time, the weak link ensures that the wedge remains in its first position during installation of the filter cartridge.

The increase in radius may as well be provided for by use of an elastic wedge element and/or use of an open ring as wedge element. Other possibilities to configure the wedge element and/or the ring segment to radially expand during a movement of the wedge element from its first position into its second position can be used as well.

Preferably, the absolute value of a quotient q being defined as $$q = \frac{|r_4(d_3'') - r_4(d_3')|}{|d_4'' - d_4'|}$$

decreases in the case of alternative I and increases in the case of alternative II with increasing axial distances $d'_4$, $d''_4$ (wherein $d'_4 \to d''_4$) of the protruding segment from the gasket front end wherein $r_4(d)$ is the radius of the inclined surface at the distance d. This shape of the protruding segment provides for a swift initial force fit, while increasing the clamping force between the filter cartridge and the housing per shifted distance, the further the wedge element is shifted in the first direction. Thereby, the wedge element sits particularly reliable in the gap between the housing cover and the protruding segment.

For example, the first wedge surface and/or the portion of the protruding segment facing the first wedge surface (71) may each have/has at least one protrusion with an edge and/or crest extending at least essentially parallel to the first direction or least essentially parallel to the axial direction along the inclined surface and/or along the first wedge surface and/or along the second wedge surface, respectively. At least essentially parallel intends to express that parallel is preferred, but deviations can be accepted. For example, deviations within $\pm\alpha_c, \alpha_c \in \{30°, 20°, 15°, 10°, 5°, 2.5°, 1°, 0°\}$ can be accepted. The crests may alternatively be helical, configured to force the wedge element against the protruding segment in case the wedge element rotates relative to the connector and/or the housing cover. These protrusions allow for shifting the wedge element in the first direction while at the same time block and/or prevent a rotation of the wedge element relative to the connector or relative to the housing cover. Each of these measures further contributes to prevent the housing cover from coming loose.

Optionally, the gasket may be attached to the wedge element. This eases assembly of the filter cartridges while at the same time increases the reliability of the locking mechanism preventing the housing cover from coming loose.

In preferred example, the radial span $\Delta Ar_g$ of the uncompressed gasket may be greater than the radial span $\Delta r_w$ of the wedge element. The wedge thus fits easily into the gap between the housing cover and the peripheral surface while the gasket reliably seals the gap between the peripheral surface and the housing cover.

Only to redraft it in other words, the gasket may abut and hence entrain the wedge element from the wedge's first position at least essentially parallel to the longitudinal direction if the gasket is sled or shifted from the first gasket position into the second gasket position, e.g. by the pressure gradient between the back side of the wedge element facing surface of the gasket and the opposed surface of the gasket (facing away from the back side, e.g. in the rearward direction). Similarly, in case of the alternative II, the gasket may be shifted until into its second gasket position. Once this second position is reached, the fluid pressure on the gasket and the rearward-facing side of the connector shifts the filter cartridge onto the wedge element thereby shifting the wedge element in the first direction, relative to the filter cartridge. In this alternative II the first direction may be a superposition of the radial direction and the rearward direction.

The first ring surface and the second ring surface are preferably located in between of the first fluid outlet and the protruding element, wherein the first ring surface may be closer to the first fluid outlet as the second ring surface. The first ring surface and the second ring surfaces may further jointly provide a plain bearing surface onto which the gasket can slide from a first gasket position on the first ring surface to a second gasket position on the second ring surface. By selecting the radii of the first and second ring surfaces the radius of the (uncompressed) gasket may be altered. For example, if the first ring surface has a smaller diameter than the second ring surface the inner radius of the gasket can be increased by shifting the gasket from the first ring surface to the second ring surface. This allows to reduce the initial breakaway force required for shifting the gasket from an initial retracted into a final extended position and hence provides an increase in reliability.

If $r_1(\varphi_1, d_1)$ is the radius of the first ring surface, $d_1$ denotes the axial distance of a point $(\varphi_1, d_1)$ on the first ring surface to the front end, $d_1^{min}$ and $d_1^{max}$ denote the minimum axial distance and the maximum axial distance of the first ring surface to the front end of the peripheral surface, respectively, $r_2(\varphi_2, d_2)$ denotes the radius of the second ring surface, $d_2$ denotes the axial distance of a point $(\varphi_2, d_2)$ on the second ring surface to the front end, $d_2^{min}$ and $d_2^{max}$ denote the minimum axial distance and the maximum axial distance of the second surface to the front end front end of the peripheral surface, respectively, then it may be preferred if $d_i \in [d_i^{min}, d_i^{max}] \forall i \in \{1,2\}$ and $d_1^{max} \leq d_2^{min}$ is observed, wherein $\varphi_1, \varphi_2$ are the respective azimuthal angles of the points. Further it may be preferred if $r_1(\varphi_1, d_1) = (1 \pm \alpha_{r_1}) \cdot c_1$, $\forall d_1$ wherein $c_1$ is a constant and $\alpha_{r_1} \in B$, and/or $r_2(\varphi, d_2) = (1 \pm \alpha_{r_2}) \cdot c_2$, $\forall d_2$ wherein $c_2$ is a constant and $\alpha_{r_2} \in B$, and/or $r_2(\varphi, d_2) > r_1(\varphi, d_1)$, $\forall d_1, d_2$ at any given angle $\varphi := \varphi_1 = \varphi_2$, wherein $B = \{0.10, 0.05, 0.025, 0.01, 0\}$. These measures each contribute to a decrease of the breakaway force of the gasket as well as to reliable seal of the gap between the peripheral surface and the housing cover.

The protruding segment may have a radius $r_4(\varphi_4, d_4)$, wherein $d_4$ denotes the axial distance to the front end, $d_4^{min}$ and $d_4^{max}$ denote the minimum axial distance and the maximum axial distance of the protruding segment to the front end of the peripheral surface. Preferably the relation $r_4(\varphi, d_4) > r_2(\varphi, d_2) \forall d_2, d_4$ holds, wherein $d_4^{min} \geq d_2^{max}$ for any given angle $\varphi$ for which the at least one inclined surface exists. This ensures that the force providing the force fit is evenly distributed.

The gasket, if positioned on the second ring surface may preferably protrude radially over the wedge element in its first position and/or in its second position to thereby ensure that the gap between the peripheral surface and the housing cover is sealed tightly.

In another example, the filter housing encloses the filter cartridge. The filter housing includes at least a housing socket and the removable housing cover. The housing cover may have a proximal end with a first thread and the housing socket may have a second thread being releasably engaged (or configured for being releasably engaged) into the first thread thereby enclosing a volume configured for receiving the filter cartridge. The housing cover may further include an inwardly facing ring surface being radially opposed to the peripheral surface. The radius $r_h$ of the inward facing surface may preferably be greater than the maximum radius $r_5^{max}$ of the protruding segment and smaller than the sum of the maximum radius $r_5^{max}$ of the protruding segment and the radial span $\Delta r_w$ of the wedge element, i.e. $r_5^{max} < r_h < r_5^{max} + \Delta r_w$.

Herein the term wedge element has been used to imply that the wedge element may preferably be configured to be clamped in between of the connector and the housing cover. The wedge element does not necessarily require to have the typical shape of a wedge being typically considered to have a triangular cross section. As will be apparent from the description of the figures below, the wedge element can have almost any shape, that forces the wedge element outwards (e.g. in the first direction) when a force parallel to the longitudinal axis is applied to the back side of the wedge element, the protruding segment of the peripheral surface being abutted in operation by the wedge element and the wedge element are hence configured to jointly provide for a movement of the wedge element in the first direction, if a force is applied to the back side of the wedge, wherein the back side of the wedge faces away from the protruding segment.

BRIEF DESCRIPTION OF THE DRAWINGS

In the following, the invention will be described by way of example, without limitation of the general inventive concept, on examples of embodiment and with reference to the drawings.

Figure 1:
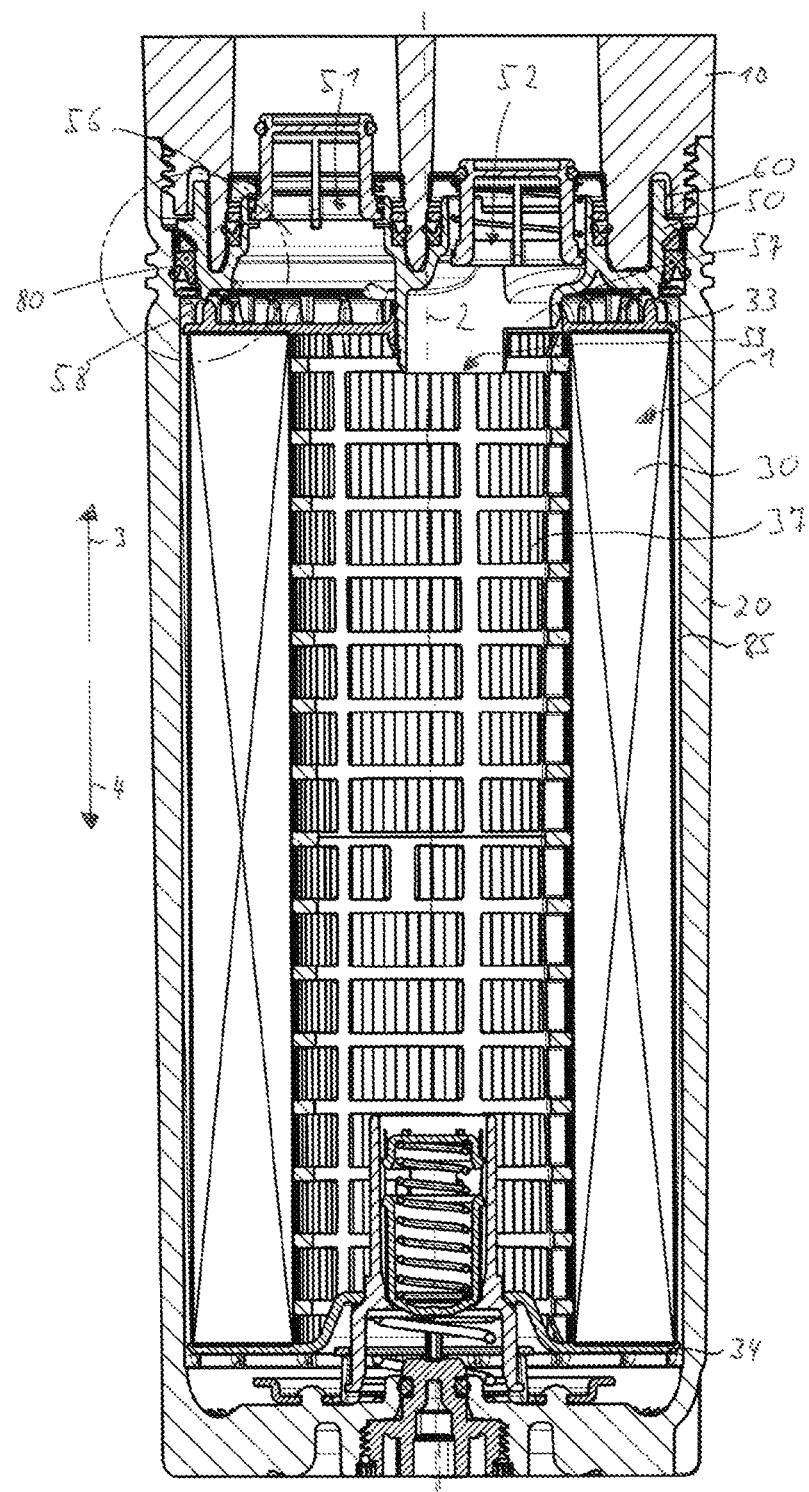
FIG. 1 presents an example filter cartridge in an example filter housing.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

In FIG. 1 a first embodiment of a filter cartridge 1 is shown. The filter cartridge 1 may be located inside a filter housing with a socket 10 and a housing cover 20. As can be seen, the housing cover 20 may be connected by a threaded connection to the housing socket 10. The filter housing has a sealing surface 25 facing inwards, preferably radially inwards towards the longitudinal axis 2 of the filter cartridge 1.

The filter cartridge 1 has a connector element 50, as well briefly "connector 50", for fluidly connecting a filter element 30 of the filter cartridge 1 into a fluid flow. The filter element 30 may define a fluid channel 37 with a longitudinal axis 2. In operation, a fluid (e.g. oil) may enter the filter cartridge 1 via a first fluid port 51 of the connector 50, flow through a first conduit 56 to a first fluid opening 58 in the peripheral surface of the filter cartridge 1. In the depicted example, the first fluid opening 51 may be a slot being formed in between of a rearward-facing side 54 of the connector 50 and a front-end cap 33 of the filter element 30. But this location is only a preferred example. In other examples the boundary of the first fluid opening 58 may be entirely defined by the connector 50 or alternatively by the front-end cap 33 or even by some other part of the cartridge 1. In any case, the fluid may leave the filter cartridge 1 via the first fluid opening 58 and enter a gap 85 being provided between the housing cover 20 and the filter element 30. From there, the fluid may pass the filter element 30 and enter into the fluid channel 37. The fluid may be removed from the fluid channel 37 via a second fluid port 52, which may, e.g., be formed by the optional front-end cap 33 (see FIG. 11). Alternatively, as shown in the depicted example, filtered fluid may be removed through a second fluid opening 59 in the connector 50. The optional second fluid opening 59 may be in fluid communication with an optional second fluid port 52 via an optional second conduit 57. The second fluid port 52 may preferably be coupled to a filtered fluid inlet of the filter housing.

A gasket 80 may be located between a peripheral surface 60 of the connector 50 and the sealing surface 25 of the housing, to thereby separate the gap 85 in a forward portion and a rearward portion. This separation disables a fluid flow from the rearward portion into the forward portion of the gap 85 which fluid flow would lead to leakage of the (e.g. oil or gas or fuel, etc.) filter housing. The gasket 80 thus seals the forward portion from the rearward portion of the gap 85.

Figure 2:
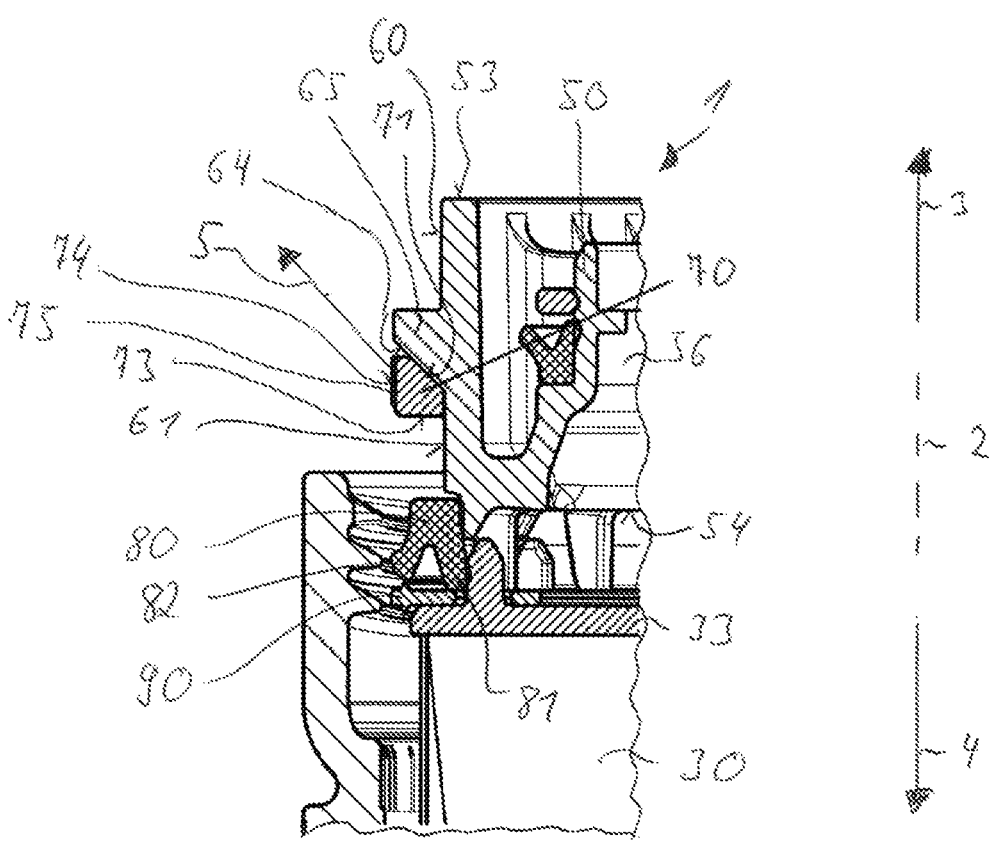
FIG. 2 presents a detail of the filter cartridge of FIG. 1 prior to be mounted.

FIG. 2 shows a detail of the filter cartridge 1 prior to or during installation of the filter cartridge 1. As can be seen, the connector 50 has a forward-facing surface 53 and a rearward-facing surface 54 at its opposite end. The forward-facing surface 53 and the rearward-facing surface 54 may be connected by the peripheral surface 60. The peripheral surface 60 may preferably have a first ring surface 61 and a second ring surface 62 (see as well FIG. 3). These first and second ring surfaces 61, 62 may be centered around the longitudinal axis 2 (c.f. FIG. 1). Herein, we assume the ring surfaces 61, 62 to be rotationally invariant under a rotation around the axis 2, but this constraint can be released and is only for conceptual simplicity.

As can be seen in FIG. 2, the radius of the first ring surface 61 may be smaller than the radius of the second ring surface 62 (for any azimuthal angle). But it is emphasized that this choice of relation is only an example. They may as well have the same radius. It is less preferred, but still possible that the radius of the first ring surface 61 may be greater than the radius of the second ring surface 62.

Further, as shown, an optional intermediate ring surface 63 may connect the first ring surface 61 and the second ring surface 62. Alternatively, the first ring surface 61 and the second ring surface 62 may be immediately adjacent to each other.

Like in FIG. 2, the gasket 80 may be located in its first axial gasket position on the first ring surface 61. This may be the intended position of the gasket 80 prior to inserting the filter cartridge 1 into the filter housing. In this preferred example, the gasket 80 has a central portion 83 being located on the first ring surface 61 and two optional legs 81, 82 which may extend at least essentially in the rearward direction 4. The first leg 81 may extend over the first fluid opening 58 and hence partially closes the first fluid opening 58. In between of the first leg 81 and the second leg 82 may be an optional groove. The bottom of the groove may be delimited as shown by the central portion 83.

The peripheral surface 60 may have a protrusion 65 with protruding segment 64 facing towards a wedge element 70. Only to avoid ambiguities, in all figures, the protruding segment 64 may be considered as a surface segment of the peripheral surface 60.

Like in this example the wedge element 70 may be located in between of the gasket 80 and the protruding segment 64, which has been referenced to above as alternative I. The wedge element 70 may have a first wedge surface 71, a second wedge surface 72 and a back side. The back side 73 faces towards the gasket 80. The first wedge surface 71 faces towards the protruding segment 64 and the second wedge surface 72 faces outwards. The second wedge surface 72 has optional crests 721 which extend essentially the parallel to the axis 2. The wedge element 70 may hence be configured to slide in a first direction 5 if a force is applied to its back side 73.

Figure 3:
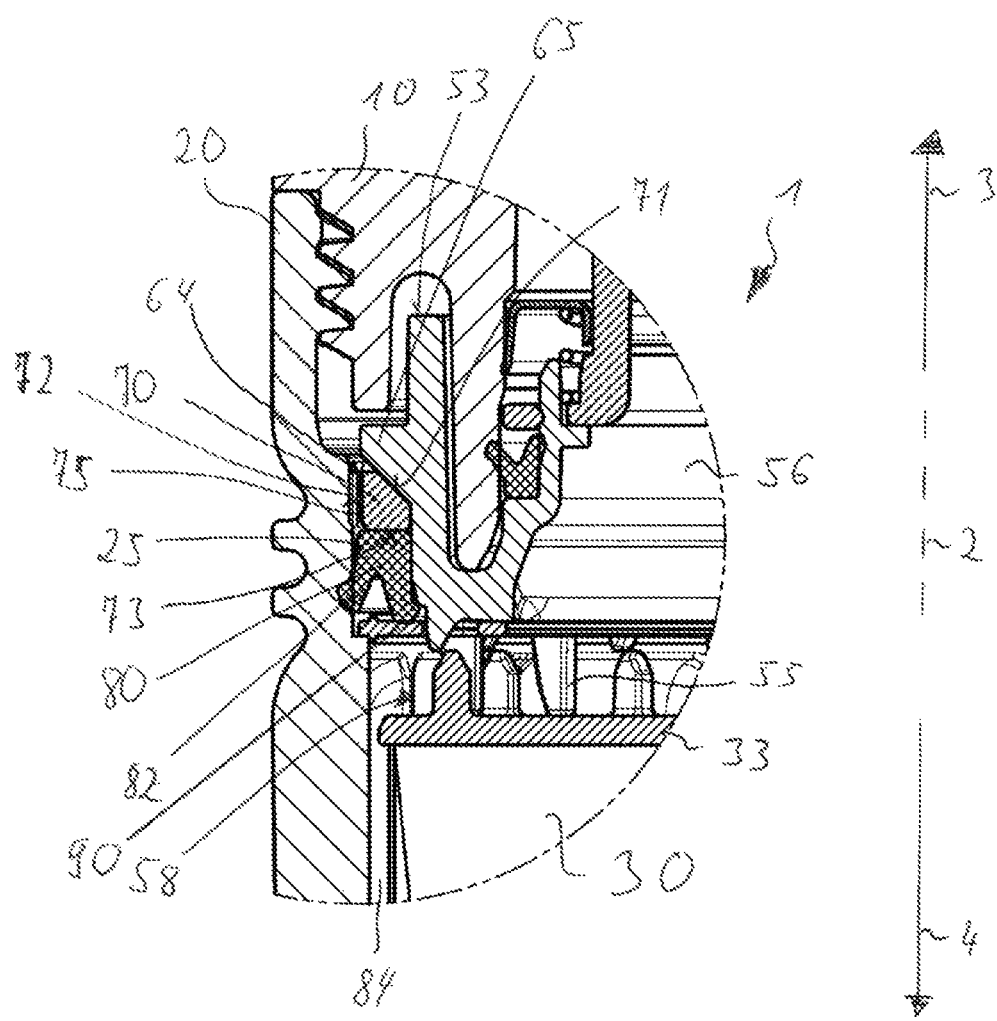
FIG. 3 presents a detail of the filter cartridge of FIG. 1 after being mounted.

In the assembled state, being shown in FIG. 3, the gasket 80 may have been shifted by a pusher 90 towards the wedge element 70. As shown, the second leg 82 of the gasket 80 may extend into the housing, which shall only symbolize that the gasket 80 seals the gap 85 tightly. In practice, the second leg 82 of course may contact the inner surface of the housing cover 20. The corresponding portion of the housing cover's surface is referenced to by the numeral 25.

Figure 4:
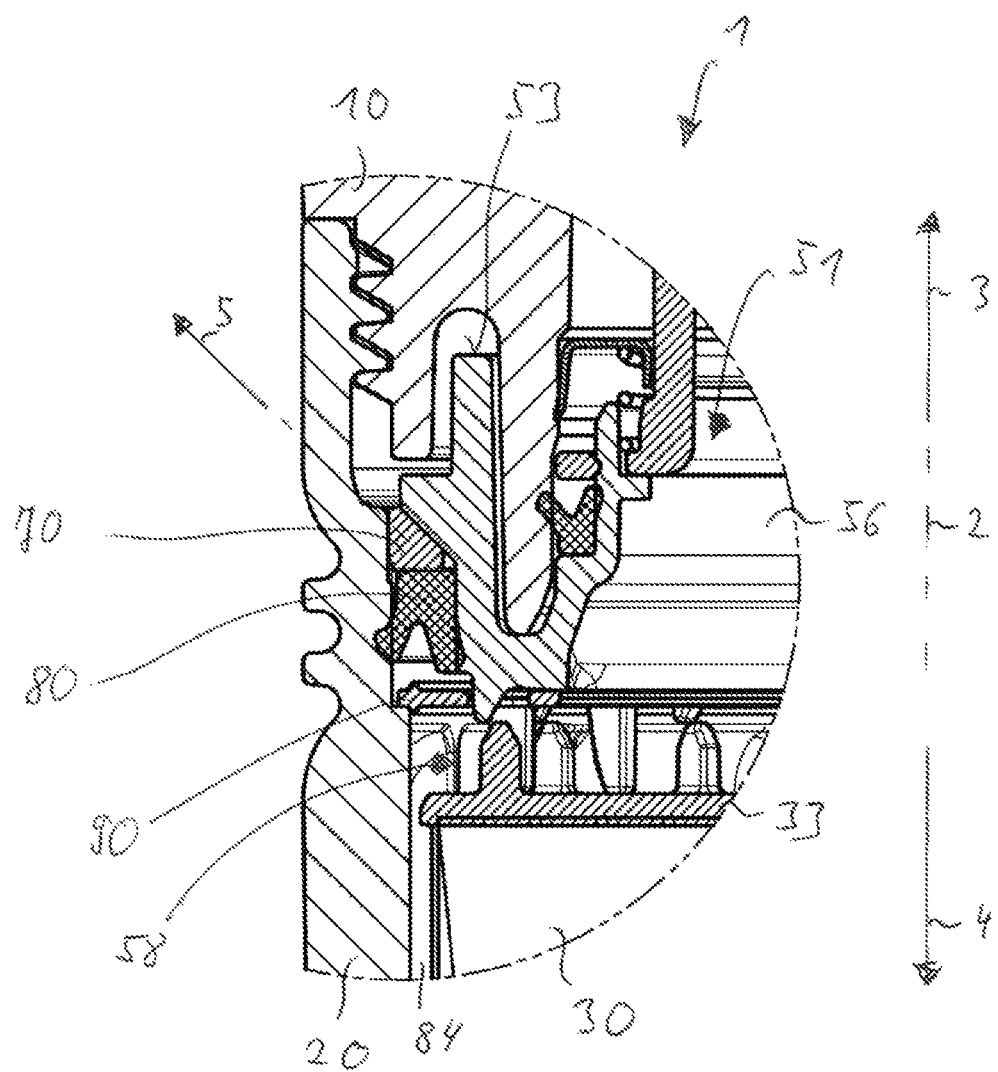
FIG. 4 presents a detail of the filter cartridge of FIG. 1 in operation.

In operation, the liquid pressure may force the gasket 80 parallel to the longitudinal axis 2, until the wedge element 70 facing side of the gasket 80 abuts the wedge element 70 as shown in FIG. 4. The gasket 80, being pushed against the wedge element 70 may entrain the wedge element 70 parallel to the longitudinal axis 2. Due to the shape of the first wedge surface 71, the wedge element 70 may as well be shifted radially outwards, what results in a movement of the wedge element 70 in the first direction 5 being a superposition of the radial direction and the forward direction 3. As a result of this process the wedge element 70 may provide a force fitting connection between the housing cover 20 and the filter cartridge 1, thereby securing the housing cover 20 in place. Optional crests 75 may engage into the corresponding sealing surface 25 of the housing cover 20.

Figure 5:
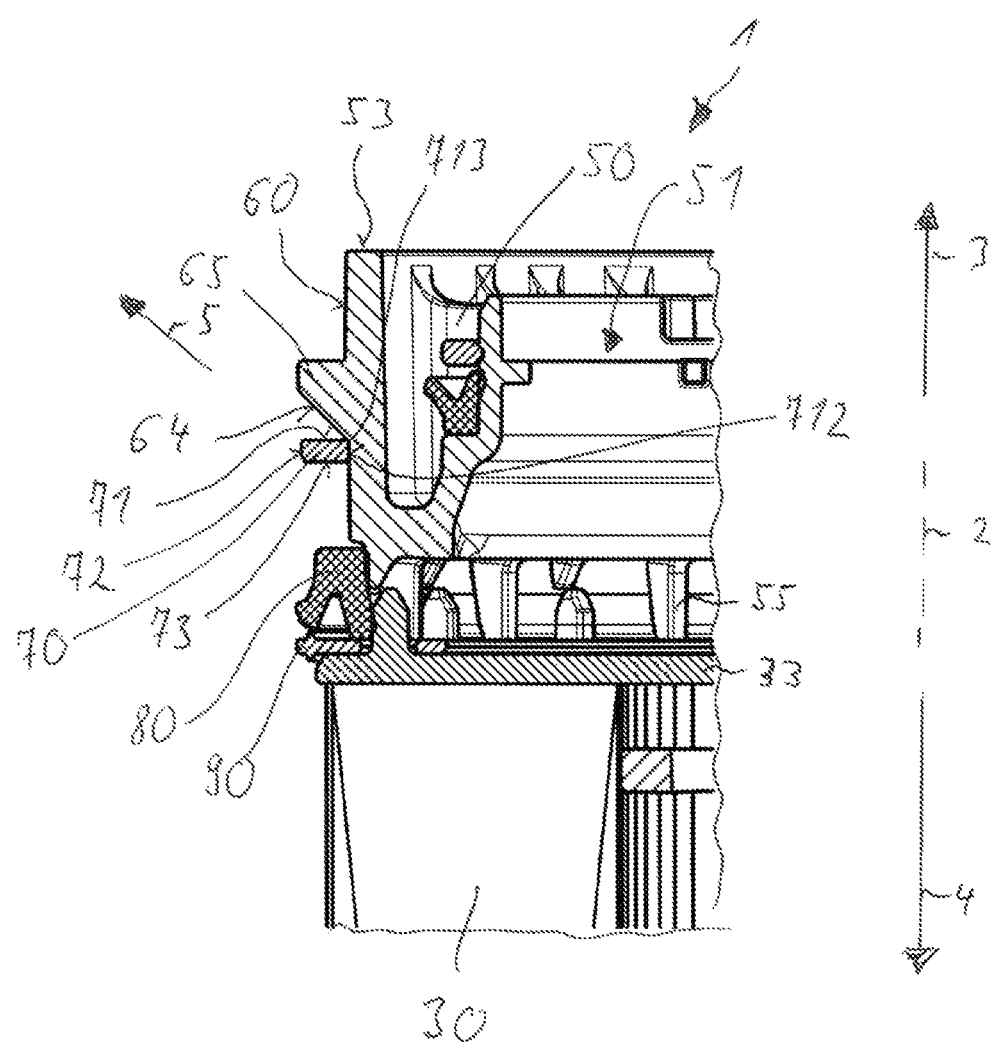
FIG. 5 presents a detail of another example filter cartridge prior to be mounted.
Figure 6:
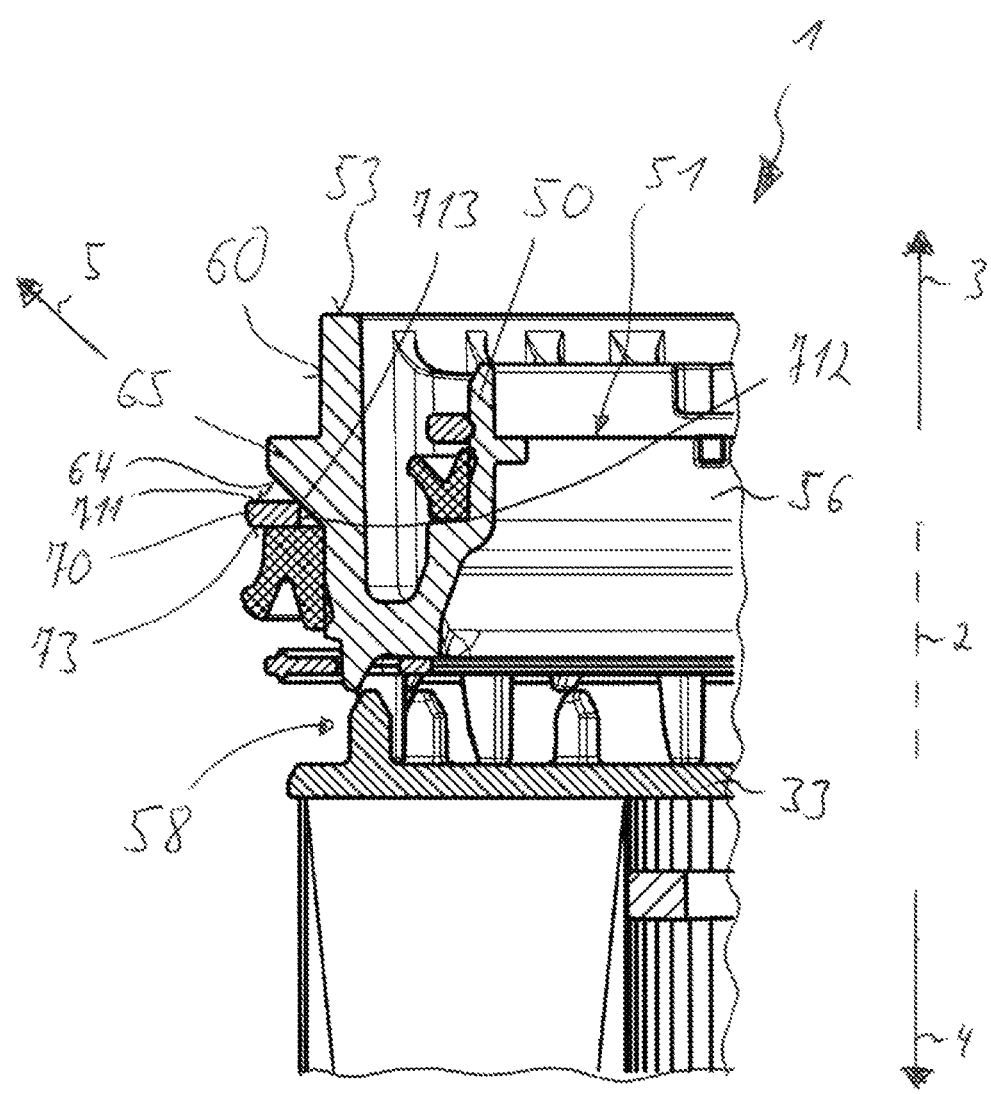
FIG. 6 presents the detail of FIG. 5 in operation.

Another example is shown in FIGS. 5 and 6: FIGS. 5 and 6 each show a detail similar to the detail of the filter cartridge 1 in FIG. 2 and description of FIGS. 1 to 4 can be read on FIG. 5 and FIG. 6 as well. FIG. 5 shows the detail of the filter cartridge 1 prior to mounting and FIG. 6 shows the essentially the same detail assuming it would be in operation. To better show the filter cartridge 1 the housing cover 20 and the housing socket 10 are not shown. Like in the example of FIGS. 1 to 4, the filter cartridge 1 may have a wedge element 70. The only difference is the cross sectional shape of the wedge element 70: Again the wedge element 70 may have a first wedge surface 71, a second wedge surface 72 and a back side 73. Still like in FIGS. 1 and 2 the back side 73 may face towards the gasket 80 and the second surface 72 may face outwards. The first wedge surface 71 has first and second segments 711, 712 forming an edge 713. Initially (see FIG. 3) the gasket 80 may sit on a first ring surface 61 of the peripheral surface 60 with its central portion 83. A portion of the gasket 80 may extend into the first fluid opening 58 and may rest on the optional pusher 90. During installation, the optional pusher 90 may shift the gasket 80 to an intermediate position (not shown) in which the gasket 80 is located on the second ring surface 62. The first shift may be accomplished, e.g., by an optional abutment of the housing cover 20. As soon as the filter is operated, the pressure at the first fluid outlet facing side of the gasket 80 increases and the resulting force on the first fluid outlet facing side shifts the gasket 80 upwards. Thereby the wedge element 70 facing side of the gasket 80 may entrain the wedge element 70 into the position as shown in FIG. 6. When the gasket 80 pushes the wedge element 70 towards the protruding segment 64, the edge 713 may slide over the protruding segment 64 of the peripheral surface 60 thereby transforming the axial movement of the gasket 80 into a superposition of an axial movement and a radial movement (the first direction 5). Accordingly, the clamping force exerted by the wedge element 70 onto the peripheral surface 60 may thus be transferred via the ring shaped edge 713 what provides for an increase of the contact pressure between the wedge element 70 and the protruding segment of the peripheral surface 60.

Figure 7:
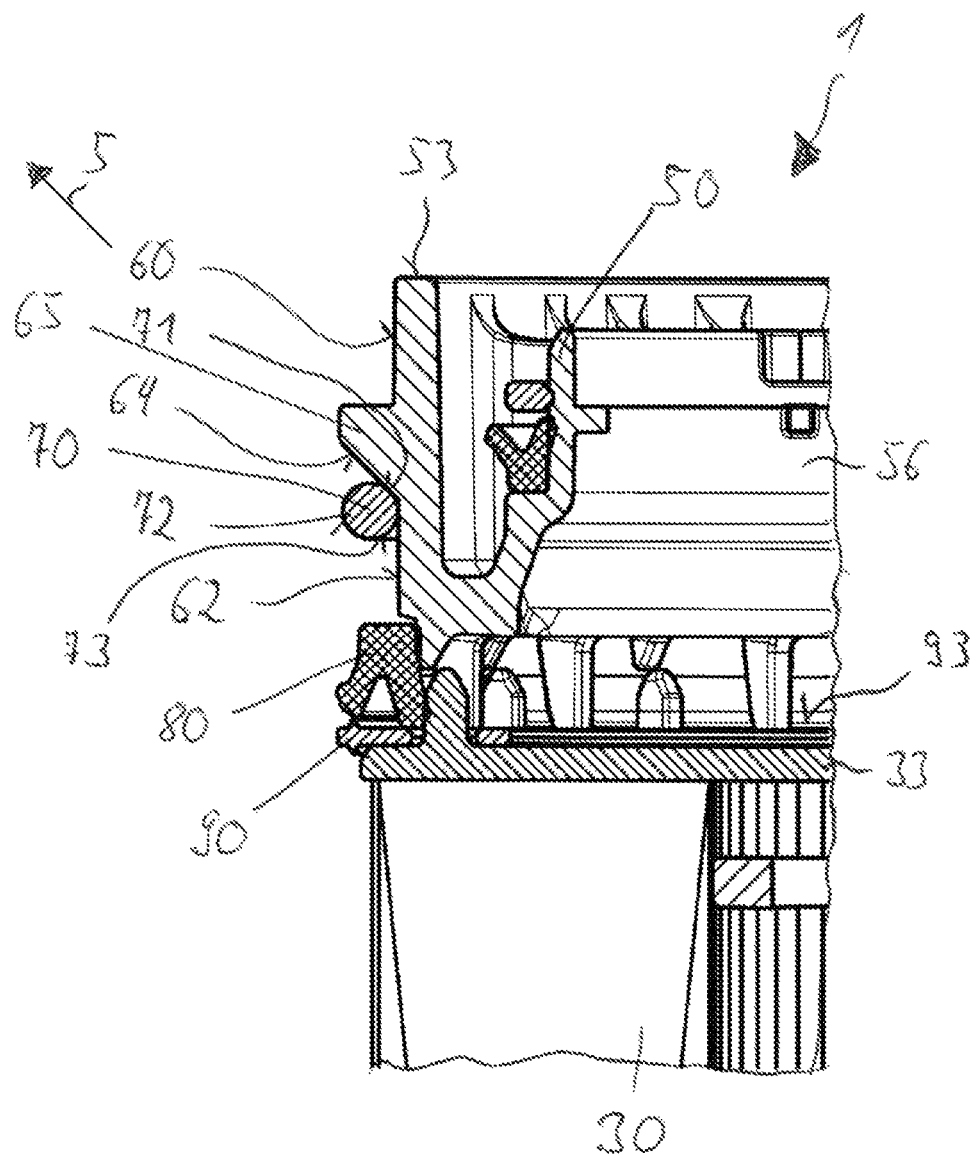
FIG. 7 presents a detail of another example filter cartridge prior to be mounted.
Figure 8:
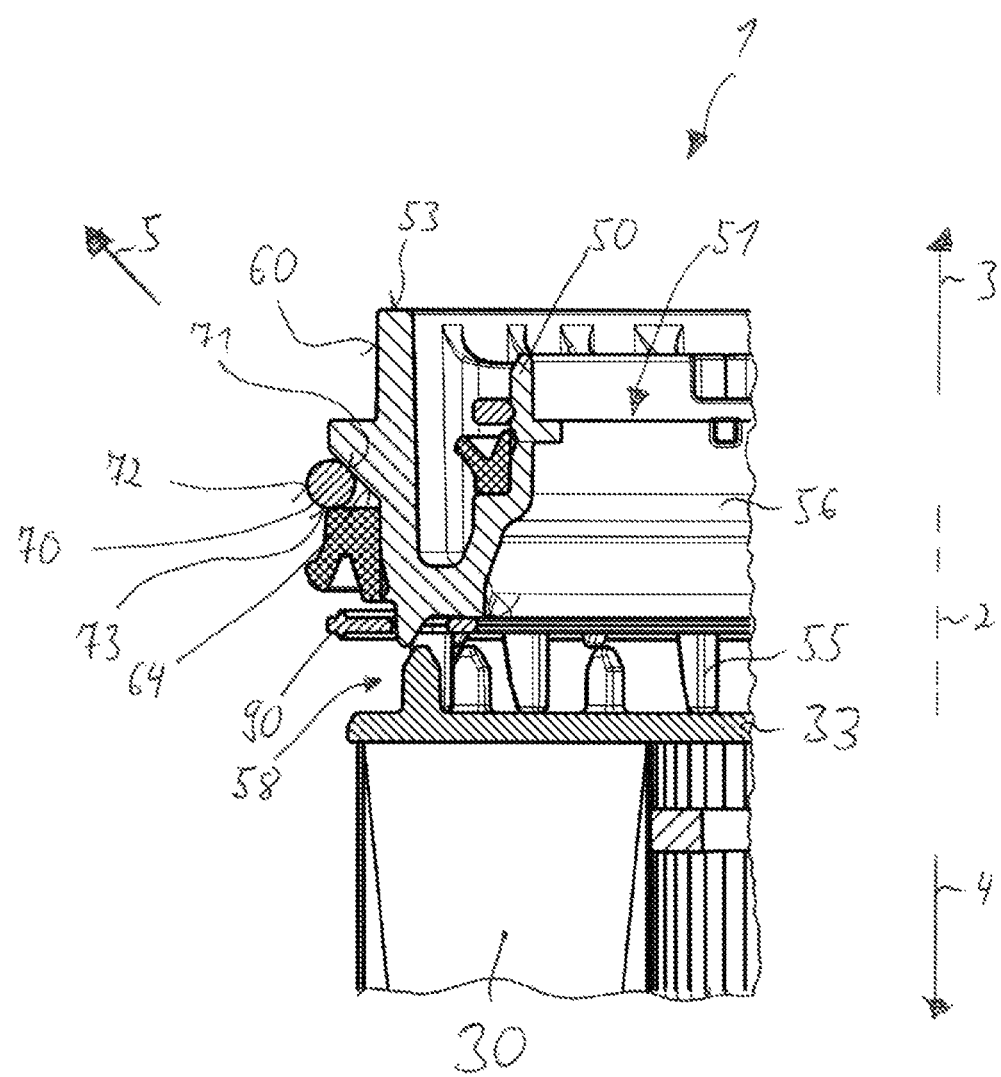
FIG. 8 presents the detail of FIG. 7 in operation.

The example as shown in FIGS. 7 and 8 is almost identical to the examples of FIG. 3 to FIG. 6 and the description of FIGS. 1 to 6 can be read on FIGS. 7 and 8 as well. The only difference is again the cross-sectional shape of the wedge element 70. In this example the wedge element 70 may have an at least approximately circular shape which as well provides a first wedge surface 71 facing towards the protruding segment 64, a second wedge surface 72 facing outwards and gasket 80 facing back side 73.

Figure 9:
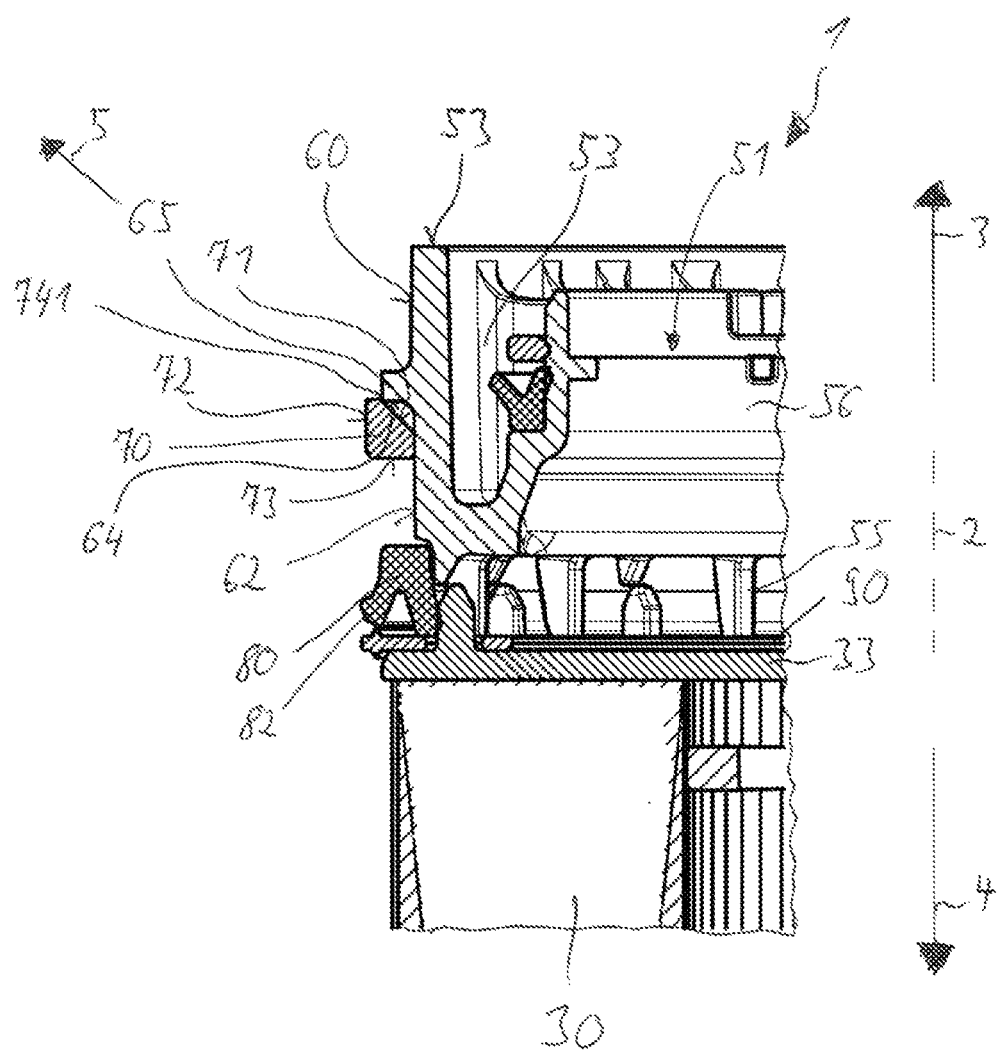
FIG. 9 presents a detail of another example filter cartridge prior to be mounted.
Figure 10:
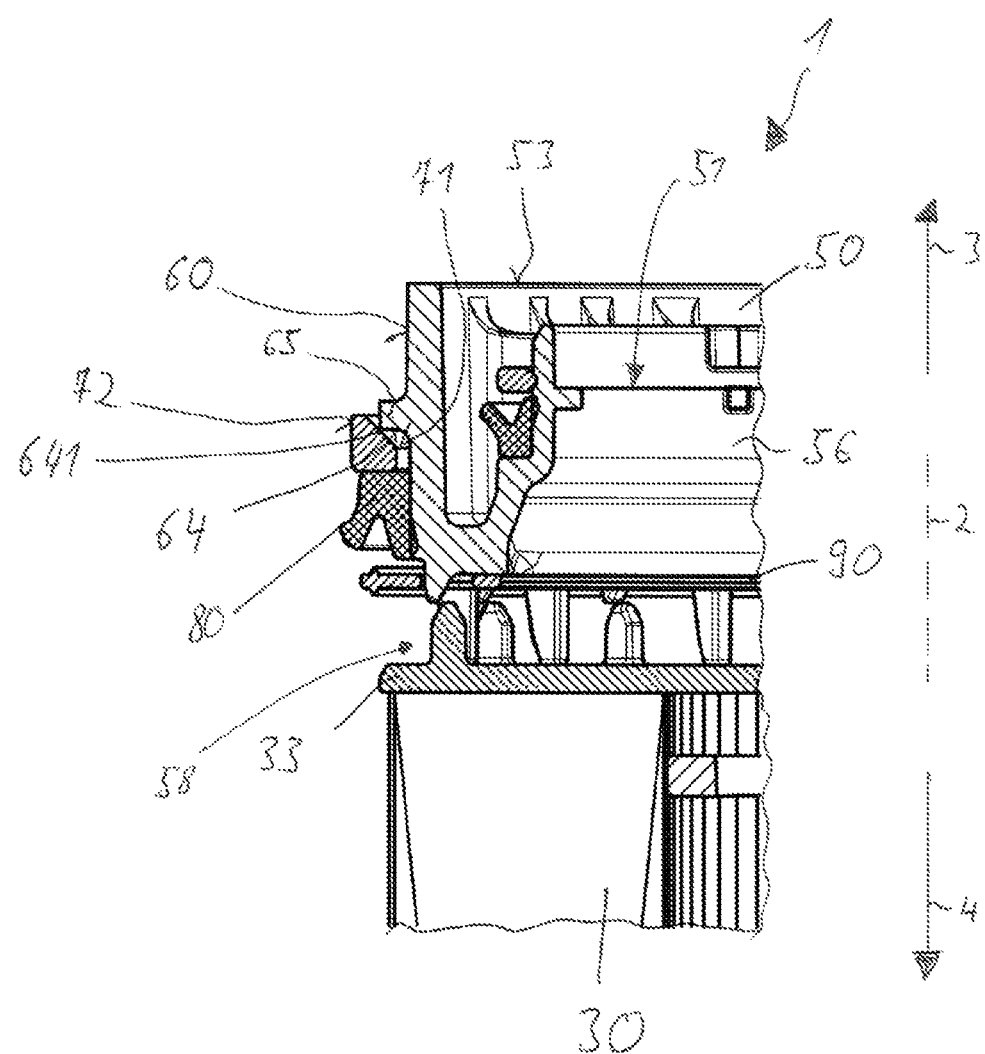
FIG. 10 presents the detail of FIG. 9 in operation.

A further very similar example is depicted in FIGS. 9 and 10. Again, the description of FIG. 1 to FIG. 8 can be read on FIG. 9 and FIG. 10 as well. The cross section of the wedge element 70 is preferably at least almost identical the one in FIG. 1 to FIG. 4, but the shape of the protruding segment 64 is different. In this example, the protruding segment 64 may form an edge 643, very similar to the edge 713 in FIGS. 5 and 6. Once the fluid pressure is applied, the first wedge surface 71 of the wedge element 70 may slide over the edge 643 of the protruding segment 64, thereby converting the axial movement of the gasket 80 into a superposition of a radial movement and the axial movement as indicated by the arrow 5 symbolizing the first direction 5. Thereby the wedge element 70 may be clamped into the gap 85 (see FIGS. 1 and 2) between the protruding segment 64 and housing cover 20, securing the housing cover 20 (see FIG. 1) in place.

Figure 11:
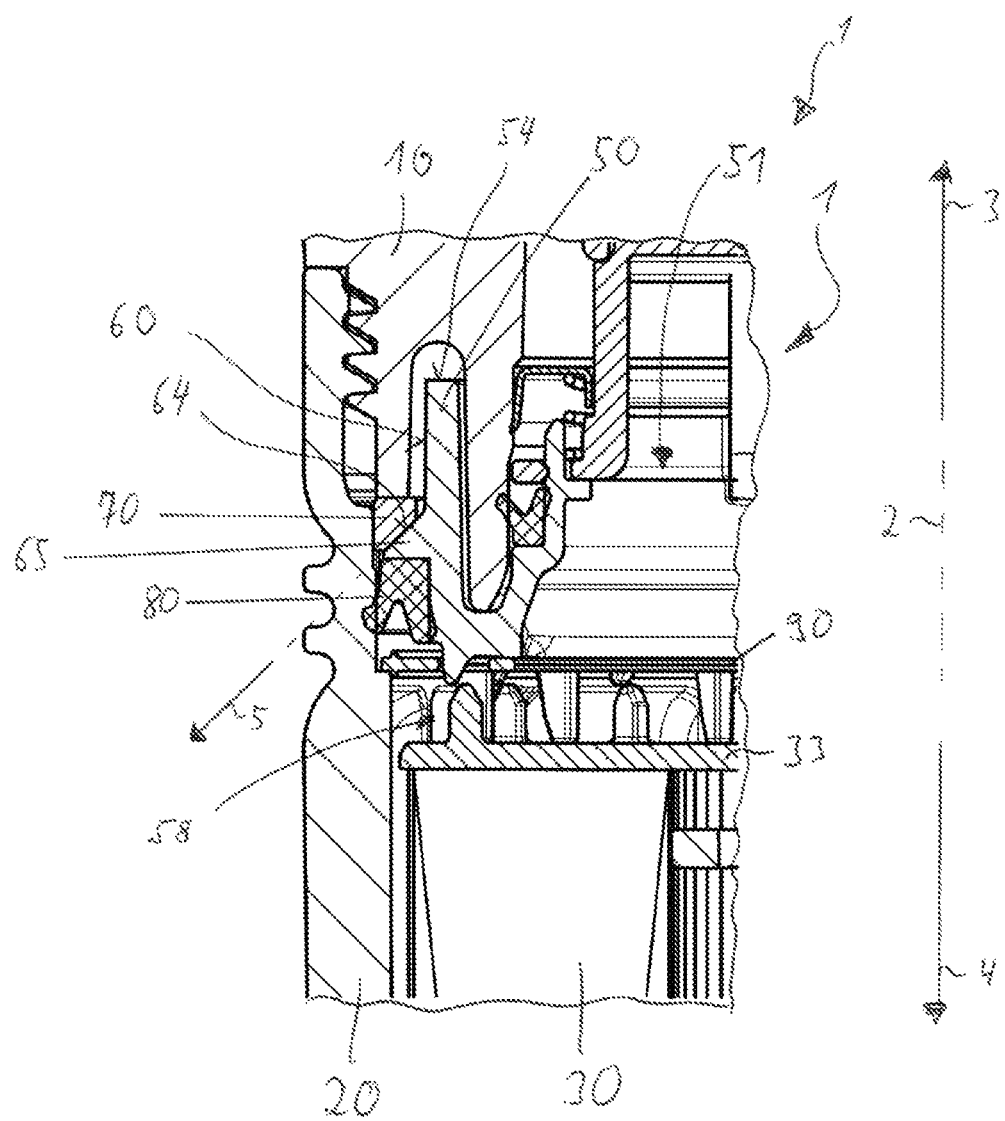
FIG. 11 presents a detail of another example filter cartridge.

FIG. 11 shows a detail of a filter cartridge 1 in a second alternative of locating the protrusion 65 relative to the wedge element 70 and the gasket 80 (referred to above as alternative II). Different to the Examples in FIGS. 1 to 10, the protrusion 65 of the connector 50 may be located in between of the first wedge surface 71 or the wedge element 70 and the gasket 80. In FIG. 11 the oil filter cartridge 1 and its components are located in their positions they take in operation. As can be seen, due to the fluid pressure, the gasket 80 may abut the gasket facing side of the protrusion 65 and may force the protrusion 65 towards the wedge element 70. Due to this force, the connector 50 may be pressed axially against the first wedge surface 70, which then slides over the protruding segment 64 in the first direction 5, which in this case is a superposition of the radial direction and the rearward direction 4 (in the alternative I it is a superposition of the radial direction and the forward direction 3). Beyond, the description of FIGS. 1 to 4 can be read as well on FIG. 11. As apparent, the shape of the wedge element 70 as well as the shape or inclination of the protruding segment 64 of the peripheral surface 60 can be altered as shown, e.g., in FIG. 5 to FIG. 10.

Figure 12:
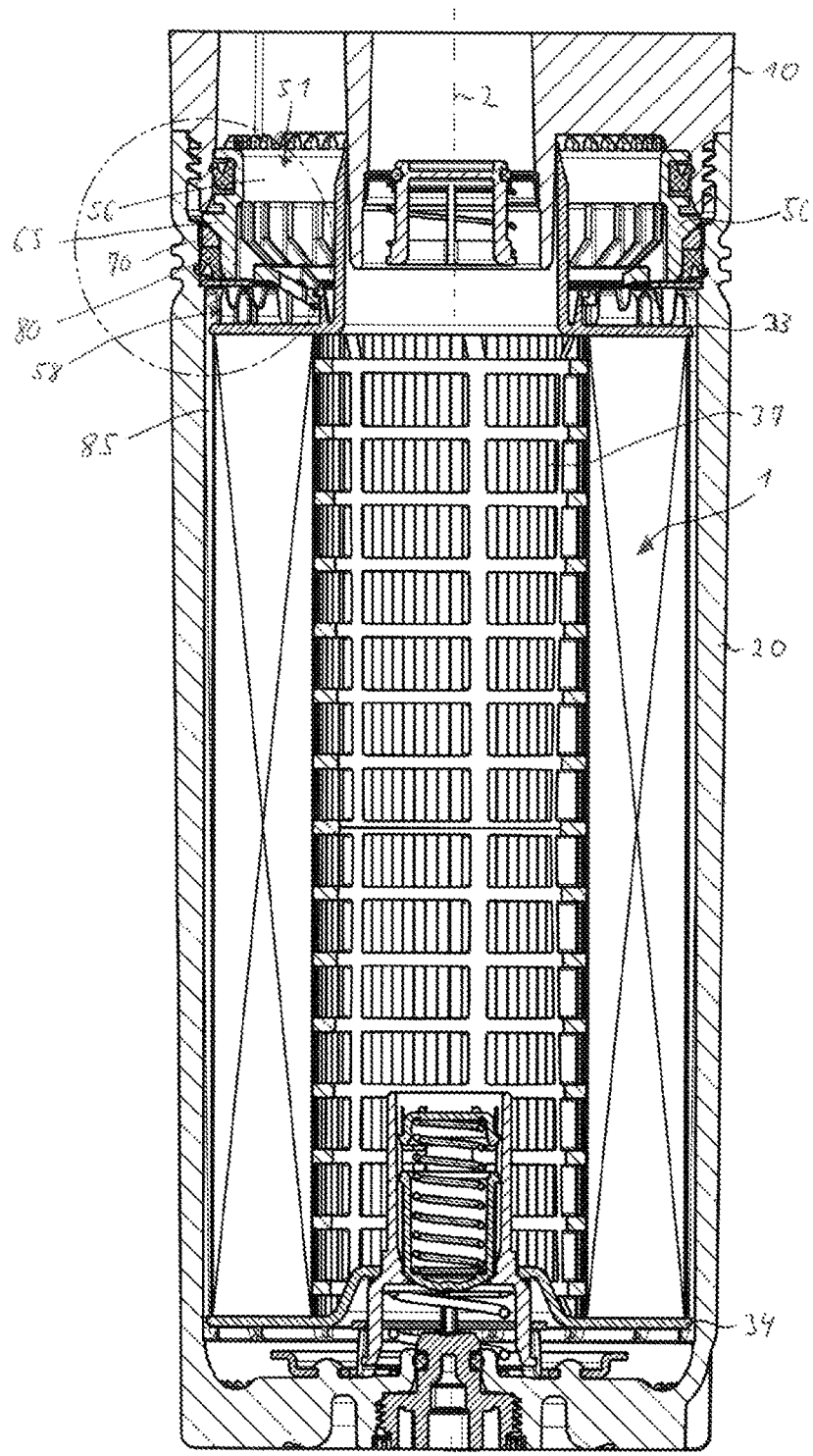
FIG. 12 presents another example filter cartridge in another example filter housing.
Figure 13:
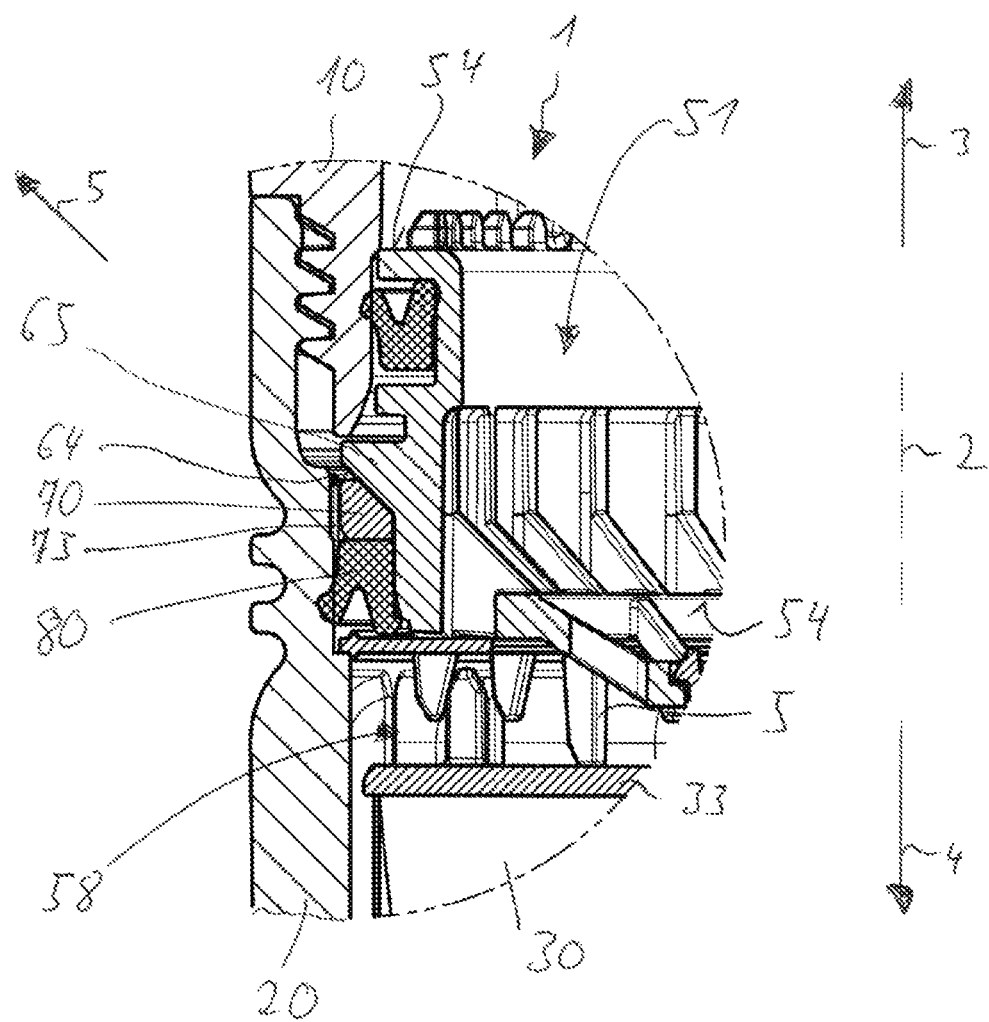
FIG. 13 presents a detail of FIG. 12.

FIG. 12 and FIG. 13 show a further example of a filter cartridge 1 the filter cartridge 1 differs from the filter cartridge of FIG. 1 to FIG. 4 only that the second conduit 59 connecting the socket 10 with the fluid channel is not present. In this example the socket 10 may directly connect to an opening the filter element 30. The opening may be provided like in this example by an optional front-end cap 33. But it shall be understood that the socket's fluid inlet could as well directly engage into the fluid channel 37. Beyond, the description of FIGS. 1 to 4 can be read on FIG. 13 as well. It is noted that the examples being shown in FIG. 5 to FIG. 11 could as well have a connector 50 without the second port 52, without the second conduit 57 and without the second fluid opening 59. Or to say it the other way, the examples protrusions 65 and the example wedge-elements 70 and their example orientations to another could as well be transferred to the connector 50 of the filter cartridge in FIGS. 12 and 13.

In all depicted examples a preferred example gasket 80 has been shown. It comes without saying that any gasket 80, being configured to slide on the peripheral surface 60 while sealing the gap 84 can be used. The shape of the gasket 80 is not relevant. In the simplest example, the gasket 80 may be an O-ring, alternatively the gasket 80 may have a polygonal (e.g. rectangular) or oval cross section or combinations thereof. Further, there is no necessity that the first ring surface 61 and the second ring surface 62 have different radii. The shown relation of the radii may as well be inverted as explained above.

It will be appreciated to those skilled in the art having the benefit of this disclosure that this invention is believed to provide a fluid filter cartridge and a filter system. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 filter cartridge
2 longitudinal axis
3 forward direction
4 rearward direction
5 first direction
6 second direction
10 socket
15 housing cover facing rim
20 housing cover
25 sealing surface
30 filter element
33 front-end cap
34 rear-end cap
37 fluid channel
50 connector element/connector
51 first fluid port
52 second fluid port
53 forward-facing side
54 rearward-facing side
55 spacer element
56 first conduit
57 second conduit
58 first fluid opening
59 second fluid opening
60 peripheral surface of connector element
61 first ring surface
62 second ring surface
63 intermediate ring surface
64 protruding segment
65 block/protrusion
653 protruding edge
70 wedge element
71 first wedge surface
711 first segment of first wedge surface
712 second segment of first wedge surface
713 edge in first wedge surface
72 second wedge surface
73 back side of wedge/gasket facing surface of wedge element
74 edge in first wedge surface
75 crest on surface of wedge element/elongate protrusions
80 gasket
81 first leg
82 second leg
83 central portion
85 gap/groove
86 first gasket portion
87 second gasket portion
90 pusher

The invention claimed is:

1. A filter cartridge configured to be removably inserted into a filter housing with a housing socket and a housing cover, wherein the filter cartridge comprises at least:
a filter element forming a fluid channel with a longitudinal axis, a front end and a rear end;
a connector element being attached to the front end, wherein the connector element has at least:
a forward-facing side facing away from the front end into a forward direction being parallel to the longitudinal axis,
a peripheral surface with at least one protruding segment,
a first fluid port in the forward-facing side, being in fluid communication with a first fluid opening in a radially outward facing surface of the filter cartridge, and
a second fluid port being in fluid communication with the fluid channel,
a gasket that is supported on a first ring surface of the peripheral surface and/or a second ring surface of the peripheral surface;
wherein
(i) the gasket is movably supported on the first ring surface and/or on the second ring surface;
(ii) at least one wedge element with a first wedge surface, and a second wedge surface is movably located on the peripheral surface, wherein the first wedge surface faces towards the protruding segment and the second wedge surface faces away from the peripheral surface;
(iii) the at least one wedge element has a back side connecting the first wedge surface and the second wedge surface;
(iv) the at least one wedge element is movably supported to be moved in a first direction from a first position into a second position by exerting a force parallel to the longitudinal axis to the back side;
and wherein
a) the at least one wedge element, at least if in the first position, is positioned in between the gasket and the protruding segment, or
b) the protruding segment is in between the gasket and the at least one wedge element.

2. The filter cartridge of claim 1, wherein, when the at least one wedge element is positioned in between the gasket and the protruding segment, the gasket is attached to the at least one wedge element.

3. The filter cartridge of claim 1, wherein
the protruding segment comprises a plain bearing surface on which the at least one wedge element is movably supported to slide on the first wedge surface in the first direction if a force, having an axial component towards the protruding segment, is exerted to the back side of the least one wedge element.

4. The filter cartridge of o claim 1, wherein
if in the first position, the at least one wedge element does not radially protrude over the protruding segment, and
if in the second position, the at least one wedge element radially protrudes over the protruding segment in a radial direction.

5. The filter cartridge of claim 1, wherein
the at least one wedge element is, comprises, or is attached to a ring segment,
wherein the ring segment at least partially encircles the peripheral surface.

6. The filter cartridge of claim 1, wherein, when the at least one wedge element is in the first position, the ring segment is an initially closed ring with a weak link being configured to break if the at least one wedge element is moved from the first position towards the second position.

7. The filter cartridge of claim 1, wherein the at least one wedge element and/or the ring segment radially expands during a movement of the at least one wedge element from the first position into the second position.

8. The filter cartridge of claim 1, wherein the absolute value of a quotient q decreases with increase of axial distances $d'_4$, $d''_4$ between an inclined surface and the front end when a) the at least one wedge element is between the protruding segment and the gasket and when b) the protruding segment is between the gasket and the at least one wedge element, wherein the inclined surface is a chosen surface of the protruding surface and the surface of the at least one wedge element facing towards the protruding surface, wherein the inclined surface defines a radial displacement of the at least one wedge element when being moved in the axial direction over the peripheral surface, wherein $$q = \frac{|r_4(d_4'') - r_4(d_3')|}{|d_4'' - d_4'|},$$

and wherein $r_4(d)$ is the radius of the inclined surface at the distance d.

9. The filter cartridge of claim 1, wherein
each of the first wedge surface and/or a portion of the protruding segment facing the first wedge surface and/or the second wedge surface has at least one protrusion with an edge and/or a crest extending in the first direction within an angle of $+\alpha_c$, $\alpha_c \in \{30°, 15°, 10°, 5°, 2.5°, 1°, 0°\}$ or parallel to the axial direction within an angle of $+\alpha_c$ along the inclined surface and/or the first wedge surface and/or the second wedge surface, respectively, wherein the inclined surface comprises the protruding surface.

10. The filter cartridge of claim 1, wherein
a radial span $\Delta r_g$ of the gasket when the gasket in uncompressed is greater than a radial span $\Delta r_w$ of the at least one wedge element.

11. The filter cartridge of claim 1, wherein
the first ring surface and the second ring surface are located in between of the first fluid opening and the protruding element, wherein the first ring surface is closer to the first fluid opening than the second ring surface, and wherein the first ring surface and the second ring surface jointly provide a plain bearing surface onto which the gasket can slide from a first gasket position on the first ring surface to a second gasket position on the second ring surface.

12. The filter cartridge of claim 1, wherein, when the at least one wedge element is positioned in between the gasket and the protruding segment, the first ring surface and the second ring surface are located in between the first fluid opening and the protruding element, wherein the first ring surface is closer to the first fluid opening than the second ring surface and wherein the first ring surface and the second ring surfaces jointly provide a plain bearing surface onto which the gasket can slide from a first gasket position on the first ring surface to a second gasket position on the second ring surface, and wherein the gasket abuts and hence entrains the at least one wedge element from the first position of the at least one wedge element in the first direction if the gasket is sled from the first gasket position into the second gasket position.

13. The filter cartridge of claim 11, wherein
$r_1(\varphi_1, d_1)$ is the radius of the first ring surface, $d_1$ denotes an axial distance from a point $(\varphi_1, d_1)$ on the first ring surface to the front end, $d_1^{min}$ and $d_1^{max}$ denote the minimum axial distance and the maximum axial distance between the first surface and the front end, respectively, $r_2(\varphi_2, d_2)$ is the radius of the second ring surface, $d_2$ denotes an axial distance from a point $(\varphi_2, d_2)$ on the second ring surface to the front end, $d_2^{min}$ and $d_2^{max}$ denote the minimum axial distance and the maximum axial distance between the second surface and the front end, respectively, i.e. $d_i \in [d_i^{min}, d_i^{max}]$ $\forall i \in \{1,2\}$ and $d_1^{max} \leq d_2^{min}$, wherein $\varphi_1$, $\varphi_2$ are respective azimuthal angles of the points and wherein $r_1(\varphi_1, d_1) = (1 \pm \alpha_{r_1}) \cdot c_1$, $\forall$ $d_1$ wherein $c_1$ is a constant and $\alpha_{r_1} \in B$, and/or $r_2(\varphi, d_2) = (1 \pm \alpha_{r_2}) \cdot c_2$, $\forall$ $d_2$ wherein $c_2$ is a constant and $\alpha_{r_2} \in B$, and/or $r_2(\varphi, d_2) > r_1(\varphi, d_1)$, $\forall d_1$, $d_2$ at any given angle $\varphi := \varphi_1 = \varphi_2$, wherein $B = \{0.10, 0.05, 0.025, 0.01, 0\}$.

14. The filter cartridge of claim 13, wherein the inclined surface has a radius $r_4(\varphi_4, d_4)$, wherein $d_4$ denotes the axial distance to the front end, $d_4^{min}$ and $d_4^{max}$ denote the minimum axial distance and the maximum axial distance of the inclined surface to the front end, respectively, and in that $r_4(\varphi, d_4) > r_2(\varphi, d_2) \forall d_2$, $d_4$ wherein $d_4^{min} \geq d_2^{max}$ for any given angle $\varphi$ for which the at least one inclined surface exists, wherein the inclined surface comprises the protruding surface.

15. The filter cartridge of claim 1, wherein
the gasket, if positioned on the second ring surface, radially protrudes over the at least one wedge element that is in the first position of the at least one wedge element and/or in the second position of the at least one wedge element.

16. The filter cartridge of claim 1, wherein the filter element further comprises a front-end cap at the front end of the filter element and/or a rear-end cap at the rear end of the filter element.

17. The filter cartridge of claim 1, wherein the gasket on the first and/or second ring surface of the peripheral surface of the connector element is between the rear end facing boundary of the first fluid opening and the front end of the filter cartridge.

18. The filter cartridge of claim 1, wherein the first ring surface and/or the second ring surface of the peripheral surface of the connector element is between the first fluid opening and the front end of the filter cartridge.

19. A filter system comprising the filter cartridge of claim 1 and said filter housing,
wherein the filter housing comprises at least the housing socket and the housing cover that is removable, wherein the housing cover has a proximal end with a first thread and the housing socket has a second thread being releasably engaged into the first thread thereby enclosing a volume of the filter housing receiving the filter cartridge,
wherein the housing cover comprises an inwardly facing ring surface that is radially opposed to the peripheral surface and wherein the radius $r_h$ of the inwardly facing surface is greater than a maximum radius $r_5^{max}$ of the protruding segment and smaller than a sum of the maximum radius $r_5^{max}$ of the protruding segment and a radial span $\Delta r_w$ of the at least one wedge element, i.e., $r_5^{max} < r_h < r_5^{max} + \Delta r_w$.

* * * * *